United States Patent [19]
Pettitt

[11] Patent Number: 6,029,154
[45] Date of Patent: Feb. 22, 2000

[54] METHOD AND SYSTEM FOR DETECTING FRAUD IN A CREDIT CARD TRANSACTION OVER THE INTERNET

[75] Inventor: John Philip Pettitt, Los Altos, Calif.

[73] Assignee: Internet Commerce Services Corporation, San Jose, Calif.

[21] Appl. No.: 08/901,687

[22] Filed: Jul. 28, 1997

[51] Int. Cl.[7] .............................................. G06F 157/00
[52] U.S. Cl. ................................. 705/44; 705/38; 705/39
[58] Field of Search ................................. 705/39, 44, 16, 705/17, 18, 21, 26, 30, 38, 33, 42, 1; 235/380, 382; 902/4, 5

[56] References Cited

U.S. PATENT DOCUMENTS

| | | | |
|---|---|---|---|
| Re. 30,579 | 4/1981 | Goldman et al. | 340/149 R |
| Re. 30,580 | 4/1981 | Goldman et al. | 340/149 R |
| 3,657,702 | 4/1972 | Stephenson, Jr. | 340/149 R |
| 4,305,095 | 12/1981 | Benton | 340/825.33 |
| 4,485,300 | 11/1984 | Peirce | 235/380 |
| 4,510,382 | 4/1985 | Walter | 235/380 |
| 4,528,643 | 7/1985 | Freeny, Jr. | 364/900 |
| 4,578,530 | 3/1986 | Zeidler | 178/22.09 |
| 4,594,663 | 6/1986 | Nagata et al. | 364/401 |
| 4,734,564 | 3/1988 | Boston et al. | 235/380 |
| 4,734,858 | 3/1988 | Schlafly | 364/408 |
| 4,755,940 | 7/1988 | Brachtl et al. | 364/408 |
| 4,792,968 | 12/1988 | Katz | 379/92 |
| 4,795,890 | 1/1989 | Goldman | 235/380 |
| 4,799,156 | 1/1989 | Shavit et al. | 364/401 |
| 4,812,628 | 3/1989 | Boston et al. | 235/380 |
| 4,827,508 | 5/1989 | Shear | 380/4 |
| 4,845,739 | 7/1989 | Katz | 379/92 |
| 4,922,521 | 5/1990 | Krikke et al. | 379/95 |
| 4,935,870 | 6/1990 | Burk, Jr. et al. | 364/200 |
| 4,947,028 | 8/1990 | Gorog | 235/381 |
| 4,977,595 | 12/1990 | Ohta et al. | 380/24 |
| 4,982,346 | 1/1991 | Girouard et al. | 364/550 |
| 4,992,940 | 2/1991 | Dworkin | 364/401 |
| 5,025,373 | 6/1991 | Keyser, Jr. et al. | 364/408 |
| 5,060,153 | 10/1991 | Nakagawa | 364/405 |
| 5,077,607 | 12/1991 | Johnson et al. | 358/86 |
| 5,175,682 | 12/1992 | Higashiyama et al. | 364/408 |
| 5,177,342 | 1/1993 | Adams | 235/379 |
| 5,220,501 | 6/1993 | Lawlor et al. | 364/408 |
| 5,247,575 | 9/1993 | Sprague et al. | 380/9 |
| 5,305,195 | 4/1994 | Murphy | 364/401 |
| 5,311,594 | 5/1994 | Penzias | 380/23 |
| 5,321,751 | 6/1994 | Ray et al. | 380/23 |
| 5,336,870 | 8/1994 | Hughes et al. | 235/379 |
| 5,341,429 | 8/1994 | Stringer et al. | 380/23 |
| 5,347,632 | 9/1994 | Filepp et al. | 395/200 |
| 5,351,186 | 9/1994 | Bullock et al. | 364/401 |
| 5,351,293 | 9/1994 | Michener et al. | 380/21 |

(List continued on next page.)

OTHER PUBLICATIONS

"CyberSource IVS TM" found on the Internet at http://www.cybersource.com/html/solutions/fraudmain.html#overview, Nov. 4, 1998.

Qualcomm, Insignia, Wall Data and seven other publishers choose CyberSource to distribute products via the Internet, PRNewswire, San Jose, California, Apr. 30, 1996.

"Check Fraud: Verification Firms Help Cut $2.9 Billion Loss," Stanley H. Slom, Stores, Feb. 1992.

(List continued on next page.)

*Primary Examiner*—Allen R. MacDonald
*Assistant Examiner*—Susanna Meinecke-Diaz
*Attorney, Agent, or Firm*—McDermott, Will & Emery

[57] ABSTRACT

A method and system for detecting fraud in a credit card transaction between consumer and a merchant over the Internet. The method and system comprises obtaining credit card information relating to the transaction from the consumer; and verifying the credit card information based upon a variety of parameters. The variety of parameters are weighted so as to provide a merchant with a quantifiable indication of whether the credit card transaction is fraudulent. In so doing, an integrated verification system is provided which allows a merchant, or the like, to accurately and efficiently determine the validity of a transaction over the Internet.

3 Claims, 3 Drawing Sheets

U.S. PATENT DOCUMENTS

| | | |
|---|---|---|
| 5,377,269 | 12/1994 | Heptig et al. .............................. 380/25 |
| 5,383,113 | 1/1995 | Kight et al. ............................... 705/40 |
| 5,386,104 | 1/1995 | Sime ....................................... 235/379 |
| 5,414,833 | 5/1995 | Hershey et al. ......................... 395/575 |
| 5,475,585 | 12/1995 | Bush ....................................... 364/401 |
| 5,500,513 | 3/1996 | Langhans et al. ....................... 235/380 |
| 5,530,438 | 6/1996 | Bickham et al. ................... 340/825.34 |
| 5,557,518 | 9/1996 | Rosen ...................................... 364/408 |
| 5,590,197 | 12/1996 | Chen et al. ............................... 380/24 |
| 5,596,642 | 1/1997 | Davis et al. .............................. 380/24 |
| 5,596,643 | 1/1997 | Davis et al. .............................. 380/24 |
| 5,604,802 | 2/1997 | Holloway ................................. 280/24 |
| 5,621,797 | 4/1997 | Rosen ....................................... 380/24 |
| 5,623,547 | 4/1997 | Jones et al. ............................... 380/24 |
| 5,642,419 | 6/1997 | Rosen ....................................... 380/23 |
| 5,696,907 | 12/1997 | Tom ......................................... 395/238 |
| 5,696,909 | 12/1997 | Wallner ................................... 395/244 |
| 5,715,314 | 2/1998 | Payne et al. .............................. 380/24 |
| 5,724,424 | 3/1998 | Gifford ..................................... 380/24 |
| 5,732,400 | 3/1998 | Mandler et al. .......................... 705/26 |
| 5,757,917 | 5/1998 | Rose et al. ................................ 380/25 |
| 5,758,327 | 5/1998 | Gardner et al. .......................... 705/26 |
| 5,812,668 | 9/1998 | Weber ...................................... 380/24 |
| 5,819,226 | 10/1998 | Gopinathan et al. ....................... 705/1 |
| 5,826,245 | 10/1998 | Sandberg-Diment ..................... 705/44 |
| 5,905,736 | 5/1999 | Ronen et al. ............................ 370/546 |

OTHER PUBLICATIONS

"Faster Credit Card Authorization," anonymous, Chain Store Age Executive with Shopping Center Age, New York, Mar. 1995.

"ICS CommerceFLEX Developer's Guide and Reference," Revision 2.03, CyberSource Corporation, Apr. 1997.

"Internet Commerce Services," CyberSource Corporation, undated.

"Electronic Software Distribution," CyberSource Corporation, undated.

"Advertising Opportunities," CyberSource Corporation, undated.

"Customer Profile," CyberSource Corporation, undated.

"Shopping for Software Object on the Web," Communications Week, Nov. 1995.

"Where to Buy Objects Over The Internet," Information Week, Dec. 1995.

"Security for Computer Networks: An Introduction to Data Security in Teleprocessing and Electronic Funds Transfer," John Wiley & Sons, Dec. 1985.

Webster's II, New Riverside University Dictionary, Houghton Mifflin Company, p. 1129, 1994.

Mak, Stephen, "Network Based Billing Server", Carnegie Mellon University, Information Networking Institute, Master of Science Thesis, 1991.

Cohen, Danny, "Computerized Commerce", ISI Reprint Series ISI/RS–89–243, Oct., 1989, Reprinted from Information Processing 89, Proceedings of the IFIP World Computer Congress, held Aug. 28–Sep. 1, 1989.

Cohen, Danny, "Electronic Commerce", University of Southern California, Information Sciences Institute, Research Report ISI/RR–89–244, Oct., 1989.

Jansson, Lennart, "General Electronic Payment System", 7th Proceedings of the International Conference on Computer Communication, pp. 832–837, 1985.

Miller, S.P., et al., Kerberos Authentication and Authorization System, Project Athena Technical Plan, Section E.2.1., Massachusetts Institute of Technology, Oct., 1988.

Davies, D.W., et al., "Security for Computer Networks: An Introduction to Data Security in Teleprocessing and Electronic Funds Transfer", John Wiley & Sons, Dec. 5, 1985.

Batelaan, Richard, et al., "An Internet Billing Server: System Requirements", Carnegie Mellon University, Master of Science Thesis, 1992.

Batelaan, Richard, et al., "An Internet Billing Server Prototype Design", Carnegie Mellon University, 1992.

Bodner, Eric, et al., "The Internet Billing Server: Prototype Requirements", Carnegie Mellon University Information Networking Institute, Maser of Science Thesis, 1993.

Bodner, Eric, et al., "The Internet Billing Server: Design Document", Carnegie Mellon University Information Networking Institute, Master of Science Thesis, 1993.

Bodner, Eric, et al., "An Internet Billing Server: Analysis of Distributed Computing and Cross Platform Issues", Carnegie Mellon University, Master of Science Thesis, 1993.

Bodner, Eric, et al., "An Internet Billing Server: Availability, Reliability & Scalability Issues in the MS4 Billing Server Design & Prototype", Master of Science Thesis, 1993.

K. Rodriquez, "CyberSource sells software on Internet," InfoWorld, Nov. 21, 1994.

"CyberSource Begins to Offer Software of Symantec and Others on the Internet," The Wall Street Journal, Jan. 31, 1995.

"Software Sales Brought to the Internet," LAN Times, Jan. 9, 1995.

One–page flyer describing "software.net" service, Oct. 1995.

Fact Sheet describing "components.software.net" service, 1995.

Hewlett–Packard Company, Product Brief, "software.net" service, Sep. 1995.

CyberSource Corporation, Press Release, "Microsoft Corp. Chooses software.net to be First To Electronically Deliver Microsoft Software," Oct. 17, 1995.

J. Rigdon, "Microsoft to Sell Most Popular Software Through Resellers Using the Internet," The Wall Street Journal, Oct. 16, 1995.

CyberSource Corporation, Press Release, "Software.net Opens Internet Product Center To Connect Internet Publishers with Internet Customers," Oct. 23, 1995.

IBM Corporation, Press Release, "IBM and CyberSource Corporation Tap Into the Power of the Internet to Offer One–Stop Component Shopping," Nov. 13, 1995.

S. Kichen, "Impulse items," Forbes, May 8, 1995.

M. Moeller, "New CyberSource of Information," PC Week, Nov. 20, 1995.

H. Clancy, "Internet Makes Headway as Software Distribution Channel," Computer Reseller News, Nov. 20, 1995.

M. Marshall et al., "Shopping for Software Object on the Web," Communications Week, Nov. 20, 1995.

C. Wilder, "Where to Buy Objects Over The Internet," Information Week, Dec. 11, 1995.

CyberSource Corporation, "CyberSource Corporate Backgrounder," 1996.

CyberSource Corporation, "News and Press Release Abstracts," Apr., 1996.

Press Release, "CyberSource's New Internet Commerce Services Provide Software Publishers Turn–Key Electronic Transaction and Distribution Services," Apr. 30, 1996.

CyberSource Corporation, Internet Commerce Services, "Schedule of Services for Distributors and Merchants," Sep. 6, 1996.

CyberSource Corporation, Merchant Internet Commerce Services, "Typical Commerce Site Functions and Integration Check List," 1996.

ICS Launch Schedule, prepared and printed in Dec., 1996.

ICS Customers list, prepared and printed in Dec., 1996.

MarketingWorks, CyberSource Capabilities Brochure Outline, Dec. 10, 1996.

CyberSource's ICS Launch PR Plan, Jan. 14, 1997.

CyberSource Corporation, Brochure, "CyberSource Internet Commerce Services," 1997.

CyberSource Corporation, "Largest Internet–Based Electronic Software Superstore," undated.

CyberSource Corporation, "Internet Commerce Services," undated.

CyberSource Corporation, "Electronic Software Distribution," undated.

CyberSource Corporation, "Advertising Opportunities," undated.

CyberSource Corporation, "Customer Profile," undated.

CyberSource Corporation, "ICS CommerceFLEX Developer's Guide and Reference," Revision 2.03, Apr. 14, 1997.-

6,029,154

METHOD AND SYSTEM FOR DETECTING FRAUD IN A CREDIT CARD TRANSACTION OVER THE INTERNET

FIELD OF THE INVENTION

The present invention relates generally to credit card transactions and specifically to detecting fraud in such credit card transactions when ordering and downloading information over the Internet.

BACKGROUND OF THE INVENTION

Credit card transactions are being utilized in a variety of environments. In a typical environment a user provides a merchant with a credit card, and the merchant through various means will verify whether that information is accurate. For example, referring now to FIG. 1, a typical credit card verification system 10 is shown. In such a system, a merchant 12 receives a credit card from the customer 14. The merchant then verifies the credit card information through an automated verification system ("AVS") 16.

These systems work well in a credit card transaction in which either the customer has a face-to-face meeting with the merchant or the merchant is actually shipping a package or the like to the address of a customer. The verification procedure typically includes receiving at the AVS system address information and identity information. However, when downloading information from an online service or the Internet, the address and identity information are not enough to adequately verify that the customer who is purchasing the goods is actually the owner of the credit card. For example, an individual may have both the name and the address of a particular credit card holder and that information in a normal transaction may be sufficient for authorization of such a transaction. However, in an Internet transaction it is possible to obtain all the correct information related to the particular credit card holder through unscrupulous means, and therefore, be able to fraudulently obtain information.

Accordingly, what is needed is a system and method that overcomes the problems associated with a typical verification system for credit card transactions particularly in the Internet or online services environment. The system should be easily implemented within the existing environment and should also be straightforwardly applied to existing technology. The present invention addresses such a need.

SUMMARY

A method and system for detecting fraud in a credit card transaction between a consumer and a merchant over the Internet. The method and system comprises obtaining credit card information relating to the transaction from the consumer; and verifying the credit card information based upon a variety of parameters. The variety of parameters are weighted so as to provide a merchant with a quantifiable indication of whether the credit card transaction is fraudulent. In so doing, an integrated verification system is provided which allows a merchant, or the like, to accurately and efficiently determine the validity of a transaction over the Internet.

DETAILED DESCRIPTION

The present invention relates to a fraud detection method, system and apparatus for use in credit card transaction over online services or the Internet. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
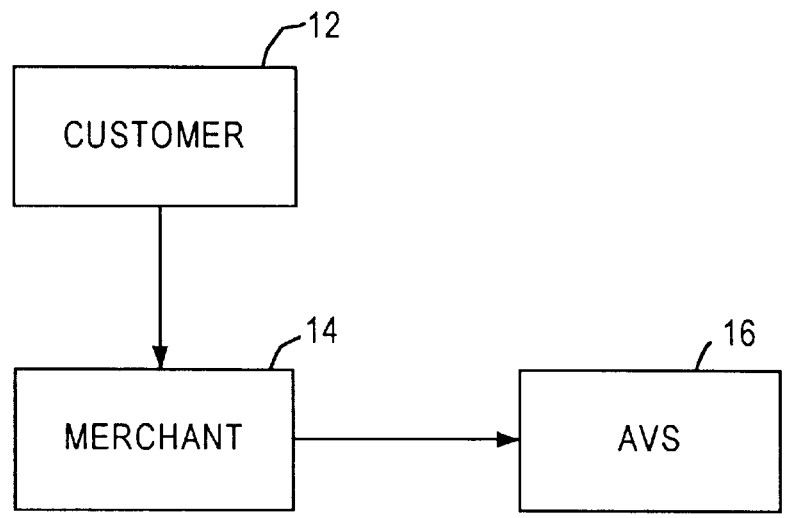
FIG. 1 is diagram of the prior art verification system for credit card transaction.
Figure 2:
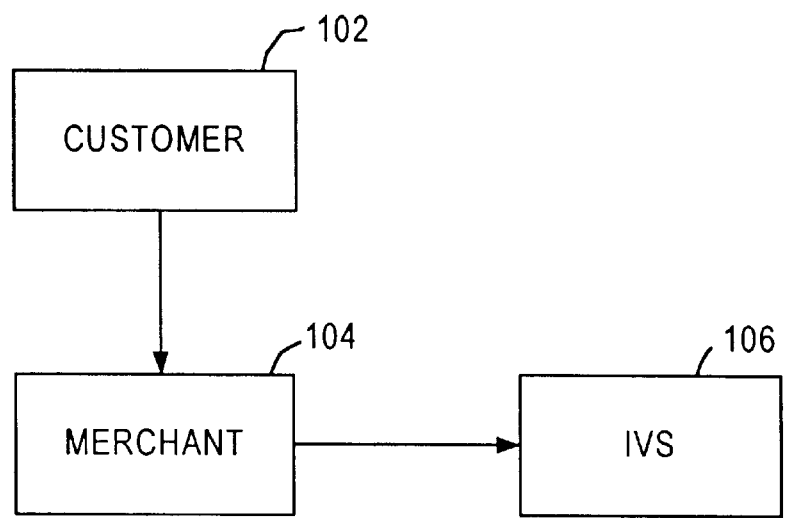
FIG. 2 is a verification system in accordance with the present invention.

The present invention provides an integrated verification system for credit card transactions over an online service or the Internet. Referring now to FIG. 2, what is shown is a block diagram of a system 100 which would use the verification procedure in accordance with the present invention. System 100 includes, similar to FIG. 1, a customer 102 and a merchant 104. The customer 102 provides the merchant with a credit card, and the merchant then sends information from it to an integrated verification system ("IVS") 106 which includes a variety of parameters providing consistency, history and other information in an integrated fashion to determine whether the credit card information is valid. The IVS 106 is typically implemented in software for example in a hard disk, floppy disk or other computer-readable medium. In a typical embodiment, when the customer 102 orders a particular piece of software to be downloaded from a merchant 104, the merchant will provide the credit card number, e-mail address and other pertinent information to the IVS 106. The integrated verification system 106 then weights the variety of parameters so as to provide a merchant with a quantifiable indication on whether the credit and transaction is fraudulent. To more clearly describe the operation of a system and method in accordance with the present invention, refer now to the following discussion in conjunction with the accompanying figures.

Figure 3:
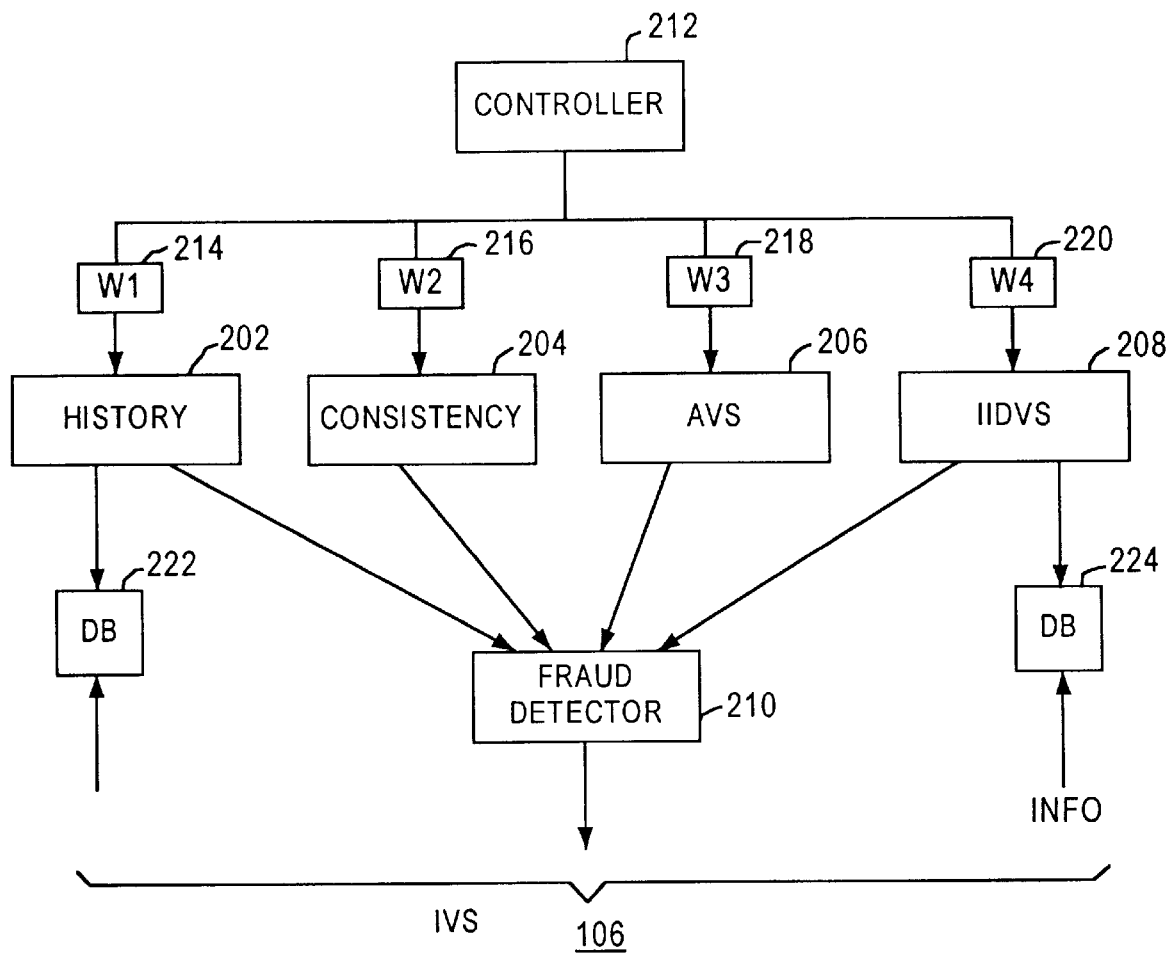
FIG. 3 is a flow chart of the verification system in accordance with the present invention.

FIG. 3 shows a simple block diagram for providing an integrated verification of a credit card transaction over the Internet. The IVS 106 includes a controller 212 which receives the credit information from the merchant and then sends that information on to a variety of parameters 202-208. The plurality of parameters operate on the information to provide an indication of whether the transaction is valid. In this embodiment, the plurality of parameters comprises a history check 202, a consistency check 204, an automatic verification system 206 and an Internet identification verification system ("IIVS") 208. The output or individual indications of validity of these parameters are provided to fraud detector 210. The fraud detector 210 combines these inputs to provide an integrated indication of whether the particular transaction is valid.

Consistency check 204 allows IVS 106 to determine whether the credit information is consistent, i.e., does the credit information match the user and other information. AVS system 206 provides similar information as AVS 16 described in FIG. 1. A key feature of both the history database 222 and the Internet ID database 224 is that they can be accessed and the information there within can be supplemented by a variety of other merchants and, therefore, information from those merchants is obtainable thereby.

History check 202 is provided which also accesses a history database 222 which may include card number and email information. The history check 202 will also actively determine if the particular transaction matches previous database information within the history database 222. Therefore, the Internet ID verification system 208 and history check 202 increases in utility over time. The Internet ID verification system 208 provides for a system for verifying the validity of an Internet address, the details of which will be discussed hereinafter. The Internet identification verification system 208 similar to the history check 202 includes a database 224 which can be added to by other merchants.

In addition, the Internet identification verification system 208 accesses and communicates with a database of Internet addresses. This system will be used to verify whether the Internet address is consistent with other Internet addresses being used in transactions utilizing this credit card.

These different parameters are weighted via weighting blocks 214–220, respectively, dependent upon the particular credit card transaction. For example, if the amount of dollar transaction is critical, it may be appropriate for the history check 202 and AVS system 206 and 206 to be weighted more critically than the other parameters. On the other hand, if a critical point is the consistency of the Internet address, then the consistency check 204 and the Internet identification system 208 may be more critical. Accordingly, each of the verification parameters 202–208 may be weighted in different amounts depending upon its importance in the verification process.

A particularly important feature of the present invention is the Internet identification system 208 and its operation within the integrated verification system 106. Through this system 208, it is possible to quickly determine if an Internet identification address is being utilized fraudulently. To describe this feature in more detail, refer now to FIG. 4 and the accompanying discussion.

Figure 4:
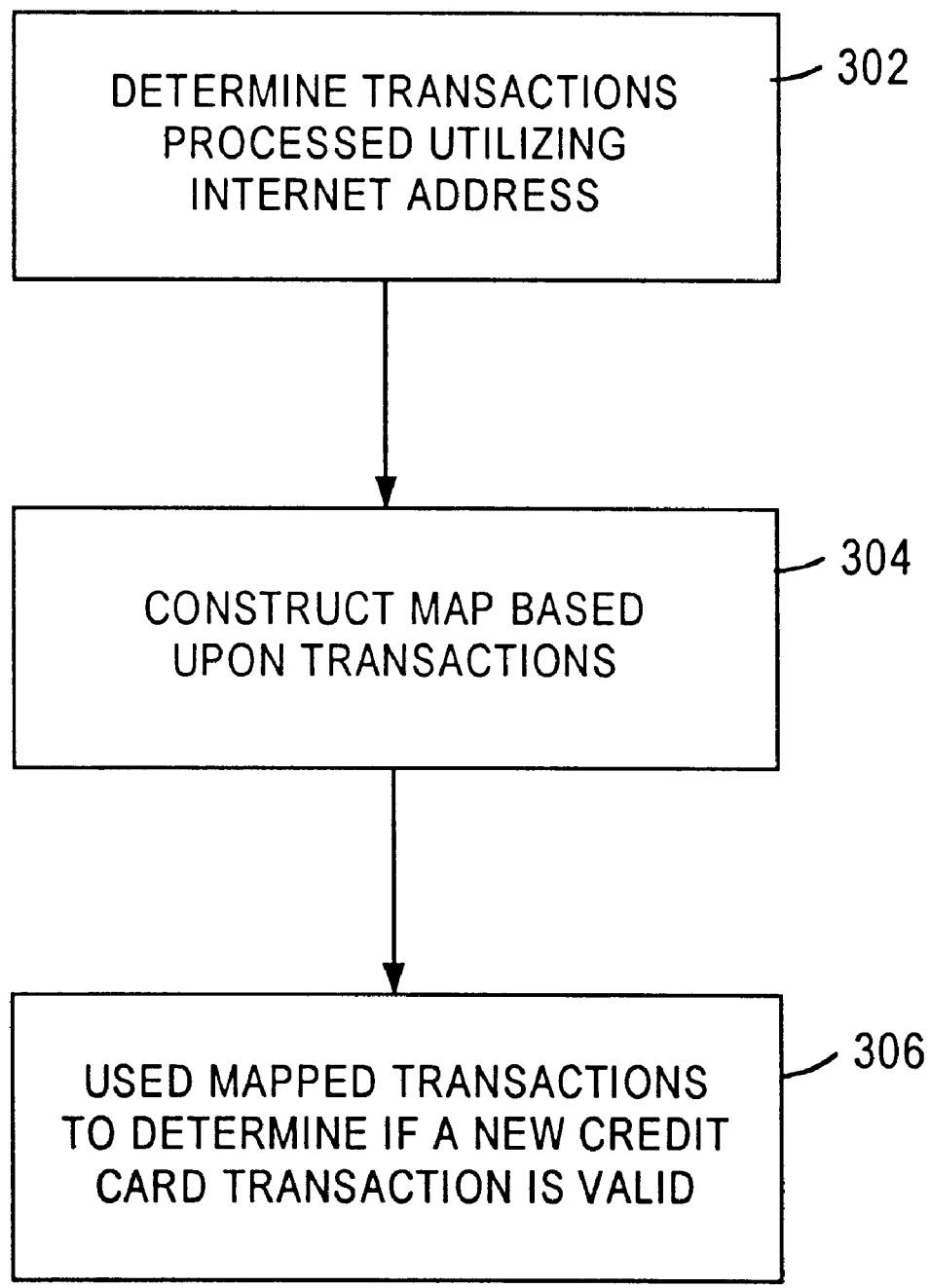
FIG. 4 is a flow chart of the integrated verification system in accordance with the present invention.

FIG. 4 is a flow chart of the Internet identification verification system 208. The goal of Internet identification verification system 208 is to determine whether the physical address or the physical location of the address compares to a previous physical location that was used for that particular Internet address. Accordingly, in the flow chart of FIG. 4, first the number of transactions that had been processed using that particular Internet address is obtained from the database 224, via step 302. Thereafter, a map of those transactions is constructed based on those obtained transactions, via step 304. Finally, the constructed map is used to determine if the new credit card transaction is valid, via step 306. Accordingly, through a system and method in accordance with this system, an Internet identification verification system is provided which can quickly and easily determine whether a particular Internet address is related to a particular credit card transaction.

Accordingly, what is provided is a system and method for accurately determining whether a particular credit card transaction is a fraudulent one. The integrated verification system in accordance with the present invention provides for weighting the variety of parameters so as to provide a merchant with a quantifiable indication on whether the credit and transaction is fraudulent.

Although the present invention has been described in accordance with the embodiments shown, one of ordinary skill in the art will recognize that there could be variations to the embodiment and those variations would be within the spirit and scope of the present invention. Therefore, although the present invention was described in terms of a particular verification system, one of ordinary skill in the art readily recognizes, that any number of parameters can be utilized and their use would be within the spirit and scope of the present invention. Accordingly, many modifications may be made by one of ordinary skill without departing from the spirit and scope of the present invention, the scope of which is defined by the following claims.

What is claimed is:

1. A method for detecting fraud in a credit card transaction between a consumer and a merchant over the Internet comprising the steps of:

receiving, from the consumer, credit card information relating to the transaction;

creating and storing a consistency check mechanism, a history check mechanism, an automatic verification mechanism and an Internet identification mechanism, each of which may indicate whether the credit card transaction is fraudulent based on transaction information, in combination with information that identifies the consumer, in which the transaction information provides the merchant with a quantifiable indication of whether the credit card transaction is fraudulent;

receiving from the merchant and storing a weight value associated with each of the mechanisms and storing the weight value in association with information that identifies the mechanisms, wherein each of the weight values signifies an importance to the merchant of the value to the credit card transaction of the associated mechanism;

weighting each value of the plurality of parameters according to the weight values;

determining whether the credit card information is fraudulent, based upon the values of the parameters and the weight values;

communicating to the merchant, over the Internet, an indication whether the credit card information is fraudulent;

wherein the steps of creating and storing further include:

obtaining other transactions utilizing an Internet address that is identified with the credit card transaction;

constructing a map of credit card numbers based upon the other transactions; and utilizing the map of credit card numbers to determine if the credit card transaction is valid.

2. A computer readable medium containing program instructions for detecting fraud in a credit card transaction between a consumer and a merchant over the Internet, wherein execution of the program instructions by one or more processors of a computer system causes the one or more processors to carry out the steps of:

a) obtaining credit card information relating to the transactions from the consumer; and b) verifying the credit card information based upon values of a plurality of parameters, in combination with information that identifies the consumer, and that may provide an indication whether the credit card transaction is fraudulent, wherein each value among the plurality of parameters is weighted in the verifying step according to an importance, as determined by the merchant, of that value to the credit card transaction, so as to provide the merchant with a quantifiable indication of whether the credit card transaction is fraudulent, wherein execution of the program instructions by one or more processors of a computer system causes the one or more processors to carry out the further steps of;

obtaining other transactions utilizing an Internet address that is identified with the credit card transaction; constructing a map of credit card numbers based upon the other transactions; and utilizing the map of credit card numbers to determine if the credit card transaction is valid.

3. A method for verifying the validity of a credit card transaction over the Internet comprising the steps of:

a) obtaining other transactions utilizing an Internet address that is identified with the credit card transaction;

b) constructing a map of credit card numbers based upon the other transactions and;

c) utilizing the map of credit card numbers to determine if the credit card transaction is valid.

* * * * *

(12) EX PARTE REEXAMINATION CERTIFICATE (6342nd)
United States Patent
Pettitt

(10) Number: US 6,029,154 C1
(45) Certificate Issued: Aug. 5, 2008

(54) METHOD AND SYSTEM FOR DETECTING FRAUD IN A CREDIT CARD TRANSACTION OVER THE INTERNET

(75) Inventor: John Philip Pettitt, Los Altos, CA (US)

(73) Assignee: Cybersource Corporation, Mt. View, CA (US)

Reexamination Request:
No. 90/007,268, Oct. 26, 2004

Reexamination Certificate for:
Patent No.: 6,029,154
Issued: Feb. 22, 2000
Appl. No.: 08/901,687
Filed: Jul. 28, 1997

(51) Int. Cl.
*G06Q 40/00* (2006.01)
*G06Q 20/00* (2006.01)

(52) U.S. Cl. .............................. 705/44; 705/38; 705/39; 705/79

(58) Field of Classification Search .................. None
See application file for complete search history.

(56) References Cited

U.S. PATENT DOCUMENTS

| | | |
|---|---|---|
| 3,657,702 A | 4/1972 | Stephenson, Jr. |
| 3,950,733 A | 4/1976 | Cooper et al. |
| 4,044,243 A | 8/1977 | Cooper et al. |
| 4,254,474 A | 3/1981 | Cooper et al. |
| RE30,579 E | 4/1981 | Goldman et al. |
| RE30,580 E | 4/1981 | Goldman et al. |
| 4,326,259 A | 4/1982 | Cooper et al. |
| 4,485,300 A | 11/1984 | Peirce |
| 4,510,382 A | 4/1985 | Walter |
| 4,528,643 A | 7/1985 | Freeny, Jr. |
| 4,734,858 A | 3/1988 | Schlafly |
| 4,755,935 A | 7/1988 | Davis et al. |
| 4,760,604 A | 7/1988 | Cooper et al. |
| 4,792,968 A | 12/1988 | Katz |
| 4,845,739 A | 7/1989 | Katz |
| 4,893,330 A | 1/1990 | Franco |
| 4,897,811 A | 1/1990 | Scofield |
| 4,949,257 A | 8/1990 | Orbach |
| 4,958,375 A | 9/1990 | Reilly |
| 5,175,682 A | 12/1992 | Higashiyama et al. |
| 5,177,342 A | 1/1993 | Adams |
| 5,206,488 A | 4/1993 | Teicher |
| 5,245,657 A | 9/1993 | Sakurai |
| 5,291,550 A | 3/1994 | Levy et al. |
| 5,305,195 A | 4/1994 | Murphy |
| 5,311,594 A | 5/1994 | Penzias |
| 5,335,265 A | 8/1994 | Cooper et al. |
| 5,336,870 A | 8/1994 | Hughes et al. |

(Continued)

FOREIGN PATENT DOCUMENTS

| | | |
|---|---|---|
| EP | 0418144 A1 | 3/1991 |
| EP | 1081665 A1 | 3/1991 |
| EP | 0468229 A2 | 7/1991 |
| WO | WO 94/06103 | 3/1994 |
| WO | WO-96/31043 | 10/1996 |
| WO | WO97/00483 A1 | 1/1997 |
| WO | WO 98/54667 A1 | 12/1998 |

OTHER PUBLICATIONS

Alfuraih, S., et al. "Using Trusted Email to Prevent Credit Card Frauds in Multimedia Products", World Wide Web Internet and Web Information Systems, 5, 2002, pp. 245–256.

(Continued)

*Primary Examiner*—Jeanne M Clark

(57) ABSTRACT

A method and system for detecting fraud in a credit card transaction between consumer and a merchant over the Internet. The method and system comprises obtaining credit card information relating to the transaction from the consumer; and verifying the credit card information based upon a variety of parameters. The variety of parameters are weighted so as to provide a merchant with a quantifiable indication of whether the credit card transaction is fraudulent. In so doing, an integrated verification system is provided which allows a merchant, or the like, to accurately and efficiently determine the validity of the transaction over the Internet.

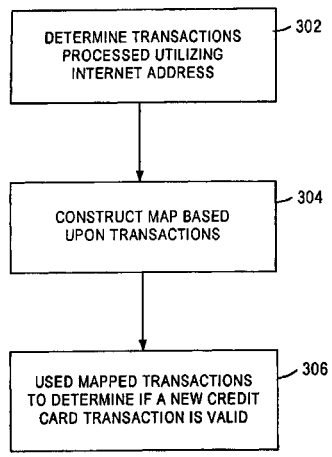

U.S. PATENT DOCUMENTS

| | | | |
|---|---|---|---|
| 5,341,429 A | 8/1994 | Stringer et al. |
| 5,347,632 A | 9/1994 | Filepp et al. |
| 5,351,186 A | 9/1994 | Bullock et al. |
| 5,351,293 A | 9/1994 | Michener et al. |
| 5,351,296 A | 9/1994 | Sullivan |
| 5,386,104 A | 1/1995 | Sime |
| 5,398,300 A | 3/1995 | Levey |
| 5,414,833 A | 5/1995 | Hershey et al. |
| 5,420,405 A | 5/1995 | Chasek |
| 5,436,971 A | 7/1995 | Armbrust et al. |
| 5,471,627 A | 11/1995 | Means et al. |
| 5,495,521 A | 2/1996 | Rangachar |
| 5,500,513 A | 3/1996 | Langhans et al. |
| 5,511,122 A | 4/1996 | Atkinson |
| 5,515,307 A | 5/1996 | Aiello et al. |
| 5,530,438 A | 6/1996 | Bickham et al. |
| 5,557,518 A | 9/1996 | Rosen |
| 5,596,642 A | 1/1997 | Davis et al. |
| 5,604,802 A | 2/1997 | Holloway |
| 5,608,801 A | 3/1997 | Aiello et al. |
| 5,623,547 A | 4/1997 | Jones et al. |
| 5,627,886 A | 5/1997 | Bowman |
| 5,627,972 A | 5/1997 | Shear |
| 5,629,982 A | 5/1997 | Micali |
| 5,671,280 A | 9/1997 | Rosen |
| 5,701,398 A | 12/1997 | Glier et al. |
| 5,703,949 A | 12/1997 | Rosen |
| 5,708,422 A | 1/1998 | Blonder et al. |
| 5,710,887 A | 1/1998 | Chelliah et al. |
| 5,715,314 A | 2/1998 | Payne et al. |
| 5,724,424 A | 3/1998 | Gifford |
| 5,729,594 A | 3/1998 | Klingman |
| 5,745,654 A | 4/1998 | Titan |
| 5,790,645 A | 8/1998 | Fawcett et al. |
| 5,802,497 A | 9/1998 | Manasse |
| 5,805,686 A | 9/1998 | Moller et al. |
| 5,809,144 A | 9/1998 | Sirbu et al. |
| 5,815,657 A | 9/1998 | Williams et al. |
| 5,819,226 A | 10/1998 | Gopinathan et al. |
| 5,822,737 A | 10/1998 | Ogram |
| 5,850,442 A | 12/1998 | Muftic |
| 5,870,473 A | 2/1999 | Boesch et al. |
| 5,875,236 A | 2/1999 | Jankowitz et al. |
| 5,878,139 A | 3/1999 | Rosen |
| 5,878,337 A | 3/1999 | Joao et al. |
| 5,884,289 A | 3/1999 | Anderson et al. |
| 5,897,621 A | 4/1999 | Boesch et al. |
| 5,899,980 A | 5/1999 | Wilf et al. |
| 5,970,129 A | 10/1999 | Asfar et al. |
| 5,970,469 A | 10/1999 | Scroggie et al. |
| 5,995,604 A | 11/1999 | Chan et al. |
| 6,012,042 A | 1/2000 | Black et al. |
| 6,094,643 A | 7/2000 | Anderson et al. |
| 6,119,103 A | 9/2000 | Basch et al. |
| 6,137,792 A | 10/2000 | Jonas et al. |
| 6,163,604 A | 12/2000 | Baulier et al. |
| 6,307,853 B1 | 10/2001 | Storch et al. |
| 6,330,546 B1 | 12/2001 | Gopinathan et al. |
| 6,363,488 B1 | 3/2002 | Ginter et al. |
| 6,389,402 B1 | 5/2002 | Ginter et al. |
| 6,393,016 B2 | 5/2002 | Wegner et al. |
| 6,430,539 B1 | 8/2002 | Lazarus et al. |
| 6,473,423 B1 | 10/2002 | Tebeka et al. |
| 6,516,056 B1 | 2/2003 | Justice et al. |
| 6,658,393 B1 | 12/2003 | Basch et al. |
| 2001/0029496 A1 | 10/2001 | Otto et al. |

OTHER PUBLICATIONS

Clearcommerce Corporation "An e*guide to Cyberfraud", 1999, pp. 1–9.

Cybercash, "About CyberCash, Inc.", 2000, http"//www.cybercash.com/company, CyberCash Company Information, 1 page.

Cybersource, "CyberSource Advanced Fraud Screen Enhanced by Visa," Implementation Guide, Simple Order API, Version 1.10, SCMP API, Jul. 2004, 102 pages.

Cybersource Corporation, "Fraud Control System," cybersource.com, Copyright date 1996, 1 page.

Cybersource, "Frequently Asked Questions—What is the danger of using credit cards over the internet?," CyberSource.com, Copyright date 1997, 1 page.

Cybersource, "Merchant Internet Commerce Services," CyberSource.com Copyright date 1997, 1 page.

Cybersource, "Cybersource Enhances Internet Fraud Screen to Combat Credit Card Fraud," cybersource.com, Jun. 4, 2001, http://www.cybersource.com/press_room/view.xml?page_id=579, 2 pages.

Cybersource, "CyberSource Introduces Credit Card Authorization Service Enchanced with a Powerful Fraud Screening Tool," cybersource.com, Jan. 30, 2001, http:www.cybersource.com.press_room.view.xml?page_id=237, 2 pages.

Datacash, "Payment card fraud checking service for e–commerce," http://www.datacash.com/security/tradescreening.html, printed Apr. 23, 2002, 2 pages.

Ghosh et al., "Credit card fraud detection with a neutral–network", System Sciences, 1994, vol. iii: Informational systems: Decisio Support and Knowledge–Based Systems, Proceedings of the Twenty–Seventh Hawaii International Conference, pp. 621–630, Jan. 7.

Hanagandi et al., "Density–based clustering and radial basis function modeling to generate credit card fraud scores", Computational Intelligence for Financial Engineering, 1996; Proceedings of the IEEE/IAFE 1996 Conference.

McCrea et al., "The Internal Report" prepared by CSIRO for the Australian Taxation Office as part of the ATO's Electronic Commerce Project, Jun. 1997, extracted from Google datatbase on Internet on Oct. 18, 2002.

Moeller, Michael, "New CyberSource of Information", PC Week, Nov. 20, 1995.

Richardson, "Neural networks compared to statistical techniques", Computational Intelligence for Financial Engineering, 1997; Proceedings of the IEEE/IAFE 1997, Mar. 24–25, 1997, New York City Conference.

Schoter, Dr. Andreas, et al., Digital Money Online A Review of Some Existing Technologies, Feb. 1997, pp. 1–60, inter:// trader.

Techmall, "Meridien Launches New e*Payments Research Service Identifying Web Opportunies And Risk For Retailers And Financial Firms," http://www8/techmall.com/techdocs/TS991202–1.html, printed Apr. 23, 2002, 2 pages.

"Telia puts IP at core of strategy: This Swedish Telco to install IP backbone to support Internet access, video–on–demand, etc.," Communications Week International, Oct. 2, 1995.

Savetz and Sears, "FAQs: How Do I Use the Internet as a Telephone," <http://itel.mit.edu/itel/docs/MISC/voice_faq.html> (Copyright 1995).

Sears, Andrew, "Innovation in Internet Telephony: The Internet as the Competitor to the POTS Network," Feb. 28, 1996, available at http://itel.mit.edu>.

Solomon, Richard Jay, "Anything you can do, I can do better; I can do anything better than you...," MIT Research Program on Cummunication Policy, available at http://itel.mit.edu/>, which states "Presented at the Columbia Institute of Tele–information's *The Impact of Cybercommunications on Telecommunications*, Mar. 8, 1996."

Sears, Andrew, "The Effect of Internet Telephony on the Long Distance Voice Market", Jan. 14, 1995 ("last Revised"), at 3 available at <http://itel.mit.edu>.

"IDT Releases Net2Phone Commercial Version Three Months Ahead of Schedule," Aug. 5, 1996, available at <http://web.archive.org/web/19971012121312/http:/www.net2phone.com>.

MICOM, "V/IP Phone/fax IP Gateway: Voice Interface Cards and PC Software," Nov. 14, 1996 ("Last Updated"), available at <http://web.archive.org/web/19961111024432/http:/www.micom.com/>.

Mar. 3, 1996 email from "John Pettitt" ("email: jpettitt@well.sf.ca.us (home); jpp@software.net (work)") , available at <http://www.xent.com.spring96/0252.html>.

Oct. 4, 1995 email from John Pettitt ("jpp@software.net"), available at http://www.cs.uwm.edu/~levine/comp–privacy/volume7/V7%23028.

David Gifford, et al. Payment Switches for Open Networks, Proceedings of the 40th IEEE Computer Society International Conference (1995).

ATACS™: How ATACS Works (Bedford Associates, Inc., 1996 (as of at least Jun. 28, 1996)).

Tom Fawcett & Foster Provost, Adaptive Fraud Detection, 1 Data Mining and Knowledge Discovery 1 (to appear) (1997 (as of at least Jul. 11, 1997)).

SNET Network Fraud Control System (Jan. 1994).

Tom Fawcett & Foster Provost, Adaptive Fraud Detection, 1 Data Mining and Knowledge Discovery 291 (Sep. 1997).

Tom Fawcett & Foster Provost, Combining Data Mining and Machine Learning for Effective User Profiling, Proceedings of the Second International Conference on Knowledge Discovery and Data Mining, at 8–13 (KDD–96) (AAAI Press, 1996).

"Fraud Control System" (CyberSource Corp., Jan. 10, 1997), www.cybersource.com/products/fcs.html as of Jan. 10, 1997, archived at http://web.archive.org/web/19970110062645/ cybersource.com/products/fcs.html.

Rod Newing, Data Mining, 74 Management Accounting–London 34 (Oct. 1996).

CyberSource's New Internet Commerce Services Provide Software Publishers Turn–Key.

Electronic Transaction and Distribution Services (CyberSource, Apr. 30, 1996), www.cybersource.com.news/press/96043001.html as of Apr. 30, 1996, archived at http://web.archive.org/web/19970110063129/cybersource.com/news/press/96043001.html.

Robert A. Gein & Frank A. McGillivray, The ABCs of Credit Card Processing, Perspectives on Public Communication, at 13–18 (American Public Communications Council Inc., Dec. 1995).

Sylvia Allen, Credit Card Fraudsters? SWAT Them!, On the Line, at 32 (Mar./Apr. 1997).

J. Lawrence Cunningham, Cutting Cell Fraud Frequency, Security Management (Oct. 1996).

Stephen E. Lamm, et al, Real–Time Geographic Visualization of World Wide Web Traffic, 28 Computer Networks and ISDN Systems 1457, (Fifth International World Wide Web Conference) (May 1996).

Will H. Scullin, et al, Real–Time Visualization of World Wide Web Traffic (1995), at http://citeseer.ist/psu.edu/scullin95realtime.html.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2 and 3 are determined to be patentable as amended.

1. A method for detecting fraud in a credit card transaction between a consumer and a merchant over the Internet comprising the steps of:
   receiving, from the consumer, credit card information relating to the transaction;
   creating and storing a consistency check mechanism, a history check mechanism, an automatic verification mechanism and an Internet identification mechanism, each of which may indicate whether the credit card transaction is fraudulent based on transaction information, in combination with information that identifies the consumer, in which the transaction information provides the merchant with a quantifiable indication of whether the credit card transaction is fraudulent;
   receiving from the merchant and storing a weight value associated with each of the mechanisms and storing the weight value in association with information that identifies the mechanisms, wherein each of the weight values signifies an importance to the merchant of the value to the credit card transaction of the associated mechanism;
   weighting each value of the plurality of parameters according to the weight values;
   determining whether the credit card information is fraudulent, based upon the values of the parameters and the weight values;
   communicating to the merchant, over the Internet, an indication whether the credit card information is fraudulent;
   wherein the steps of creating and storing further include:
   obtaining *information about* other transactions [utilizing] *that have utilized* an Internet address that is identified with the credit card transaction;
   constructing a map of credit card numbers based upon the other transactions; and
   utilizing the map of credit card numbers to determine if the credit card transaction is valid.

2. A computer readable medium containing program instructions for detecting fraud in a credit card transaction between a consumer and a merchant over the Internet, wherein execution of the program instructions by one or more processors of a computer system causes the one or more processors to carry out the steps of:
   a) obtaining credit card information relating to the transactions from the consumer; and
   b) verifying the credit card information based upon values of plurality of parameters, in combination with information that identifies the consumer, and that may provide an indication whether the credit card transaction is fraudulent,
   wherein each value among the plurality of parameters is weighted in the verifying step according to an importance, as determined by the merchant, of that value to the credit card transaction, so as to provide the merchant with a quantifiable indication of whether the credit card transaction is fraudulent,
   wherein execution of the program instructions by one or more processors of a computer system causes that one or more processors to carry out the further steps of;
   obtaining *information about* other transactions [utilizing] *that have utilized* an Internet address that is identified with the credit card transaction; constructing a map of credit card numbers based upon the other transactions; and utilizing the map of credit card numbers to determine if the credit card transaction is valid.

3. A method for verifying the validity of a credit card transaction over the Internet comprising the steps of:
   a) obtaining *information about* other transactions [utilizing] *that have utilized* an Internet address that is identified with the the credit card transaction;
   b) constructing a map of credit card numbers based upon the other transactions and;
   c) utilizing the map of credit card numbers to determine if the credit card transaction is valid.

* * * * *